United States Patent

Kelp

[15] 3,693,597
[45] Sept. 26, 1972

[54] HIGH-PRESSURE FEEDWATER PREHEATER

[72] Inventor: Fritz Kelp, 1 Stettiner Str., Erlangen, Germany

[22] Filed: July 19, 1971

[21] Appl. No.: 163,653

[30] Foreign Application Priority Data

July 18, 1970 Germany .......G 70 27 187.3

[52] U.S. Cl. ...................................122/32, 165/158
[51] Int. Cl. ..............................................F22b 1/16
[58] Field of Search ................122/32; 165/158, 163

[56] References Cited

UNITED STATES PATENTS 3,228,463  1/1966  Kagi ........................165/163 X
3,356,135  12/1967  Sayre .......................122/32 X

*Primary Examiner*—Kenneth W. Sprague
*Attorney*—Curt M. Avery et al.

[57] ABSTRACT

In a high-pressure feedwater preheater having a steam jacket and containing a collector having a free end extending through the steam jacket and provided with removable closure means at that free end, the collector includes a container part located wholly within the steam jacket, an appendage thereof forming the free end of the collector, and a welding seam located within the steam jacket and securing the appendage to the container part.

2 Claims, 1 Drawing Figure

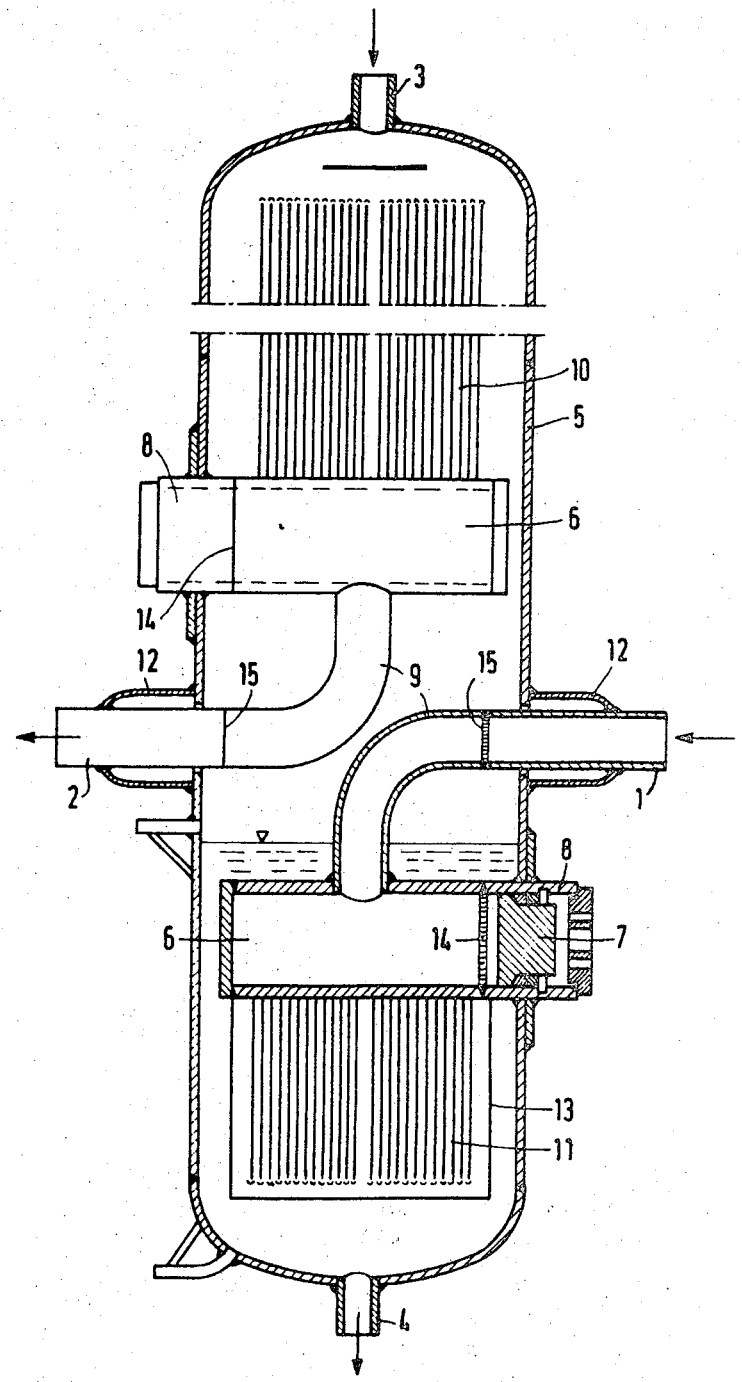

HIGH-PRESSURE FEEDWATER PREHEATER

The invention relates to high-pressure feedwater preheater of the collector construction type having a cylindrical steam jacket wherein there are disposed an inlet collector as distributor of a heating tube system traversed by feedwater, and an outlet collector extending perpendicularly to the longitudinal axis of the steam jacket. The free end of at least one of the two collectors is welded to the steam jacket and has an inspection opening and a branch for feedwater supply and a discharge passing through the steam jacket in the immediate vicinity of the end of the collector formed with the inspection opening. Both of the feedwater lines are located at the same level opposite one another at the cylindrical steam jacket.

This type of construction has the advantage of great thermal elasticity and rapid accessibility for the purpose of effecting revisions and repairs. It requires, however, a relatively large cost of manufacture in the conventional form thereof, because a large number of heating tube connections must be welded to the collectors which are secured in the steam jackets. The accessibility is consequently very restricted for this work so that the welds are very difficult to produce and the number of possible connections are unnecessarily limited.

One might consider producing the steam jacket in the vicinity thereof at which the connections are made to the collectors, of two half shells and, after welding them together, to weld the heating tubes to the collectors and the collecting lines for the feedwater. This method of avoiding the aforementioned disadvantages, causes other disadvantages, however, because the half shells are rather difficult to manufacture and, due to the necessary wall thicknesses, deformations and residual stresses occur at the welds which are not permissible or safe.

It is accordingly an object of the invention to provide high-pressure feedwater preheater wherein the collectors and the connecting lines are formed respectively of two or more parts so that the welding operations of the heating tubes can be performed outside the steam jacket before the latter is placed over the tube system. More specifically, in accordance with a further feature of the invention, it is an object of the invention to provide such feedwater preheater wherein, after introducing the heating tubes and the collectors therefor into the steam jacket, the outer parts of the collectors and the connecting lines can be welded to the similar parts located therewithin and to the steam jacket.

In accordance with another object of the invention the tube welding seams can be effected inside the tubes so that good accessibility and possibility of testing are facilitated.

A further object of the invention is to provide connections at a conventionally manufactured steam jacket that is produced without difficulty and substantially free of stress, since the possibility is provided of connecting separate connecting members between the connecting lines and the steam jacket.

With the foregoing and other objects in view, there is provided, in accordance with the invention, high-pressure feedwater preheater comprising a cylindrical steam jacket, a heating tube system located within the steam jacket and traversible by feedwater, an inlet collector connected to the heating tube system and serving as distributor of the feedwater thereto, an outlet collector also connected to the heating tube system and disposed perpendicularly to the longitudinal axis of the steam jacket, at least one of the collectors having a free end extending through the steam jacket, a closeable inspection opening formed in the free end, a connecting tube for the feedwater connected to each of the collectors, at least one of the connecting tubes being secured in the steam jacket in immediate vicinity of the free collector end formed with the inspection opening, both of the connecting tubes extending outside the steam jacket at substantially the same level opposite one another, the collectors including, respectively, a container part located wholly within the steam jacket, an appendage thereto forming the free end and a welding seam located within the steam jacket and securing the appendage to the container part and the connecting tubes including, respectively, a connecting elbow wholly within the steam jacket, a connecting tube portion partly extending from the steam jacket, and a welding seam located within the steam jacket and securing the connecting elbow to the connecting tube portion.

Other features which are considered as characteristic for the invention are set forth in the appended claims.

Although the invention is illustrated and described herein as embodied in high-pressure feedwater preheater, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing.

The FIGURE of the drawing shows a diagrammatic longitudinal cross-sectional view of a high-pressure feedwater preheater constructed in accordance with the invention.

As shown in the figure, feedwater flows in direction of the arrow at the right-hand side of the figure, through a connecting line 1 and an elbow 9 into a collector 6 acting as a distributor and flows therefrom through a multiplicity of heating tubes 11 into a condensate cooling zone 13, then up through non-illustrated lengths of heating tubes 11 and downwardly through the heating tube lengths 10 into a condensation and possibly heat-removing zone located generally at the top of the figure, from which the feedwater flows into another collector 6 after which, having traversed a second elbow 9 extending from the last-mentioned collector 6, the feedwater discharges from the high-pressure preheater through the connecting line 2 in the direction of the arrow shown at the left-hand side of the figure.

Superheated steam enters the steam jacket 5 of the high-pressure feedwater preheater of the invention through an inlet line 3 in the direction of the arrow shown at the top of the figure. The super heated steam condenses at the heating tube lengths 10. The condensate of the superheated steam is subcooled at the tube lengths 11 and discharges through the outlet line 4 in the direction of the arrow shown at the bottom of the figure.

The manufacture or assembly of the high-pressure feedwater preheater of the invention is carried out as follows:

The heating tubes 10 and 11 are welded to the collectors 6, respectively, with are provided with respective tube elbows 9. After this tube system is completely welded together, the steam jacket 5 is slid over the same. Appendages 8 of the collectors 6 are then welded at the seam 14 to the container part of the collectors 6 already located in the steam jacket 5 and are also welded to the steam jacket 5 at the opening of the latter through which the appendages 8 extend out of the latter. While the appendages 8 are being welded to the basic container part of the collectors 8, the closure member or stopper 7 is removed from the appendage 8. After the welding of these parts together has been completed, the stopper 7 is then suitably inserted and retained therein by conventional means. The feedwater inlet line 1 and the outlet line 2 are inserted through suitable openings formed in the steam jacket and are welded at 15 to the respective elbows 9. Bell-like connecting members 12 are then welded respectively to the individual lines 1 and 2 and the outlet surface of the steam jacket in order to permit compensation for manufacturing tolerances. Also, by means of using the connecting members 12, a thermally elastic connection is produced between the steam jacket and the feedwater lines 1 and 2, which is also able to absorb well and safely line forces from the connecting lines.

The preheater of the invention of the instant application combines thermally elastic construction with advantageous use of the steam jacket interior volumne since it is possible to provide all of the heating tubes that are to be located therein with relatively good access to the welds due to the production of the welding connections at the collectors 6 outside of the steam jacket 5. The welding seams that are to be made after assembly of the steam jacket 5 with the heating tube system, are circular welds which may be produced simply with no problems because circular welds or cylindrical members require the absorption of only about half of the operating stresses as to longitudinal or elongated welds.

I claim:

1. High-pressure feedwater preheater comprising a cylindrical steam jacket, a heating tube system located within said steam jacket and traversible by feedwater, an inlet collector connected to said heating tube system and serving as distributor of the feedwater thereto, an outlet collector also connected to said heating tube system, and disposed perpendicularly to the longitudinal axis of said steam jacket, at least one of said collectors having a free end extending through said steam jacket, a closeable inspection opening formed in said free end, a connecting tube for the feedwater connected to each of said collectors at least one of said connecting tubes being secured in said steam jacket in immediate vicinity of the free collector end formed with said inspection opening, both of said connecting tubes extending outside said steam jacket at substantially the same level opposite one another, said collectors including, respectively, a container part located wholly within said steam jacket, an appendage thereto forming said free end and a welding seam located within said steam jacket and securing said appendage to said container part, and said connecting tubes including, respectively, a connecting elbow wholly within said steam jacket, a connecting tube portion partly extending from said steam jacket, and a welding seam located within said steam jacket and securing said connecting elbow to said connecting tube portion.

2. High-pressure feedwater preheater according to claim 1 wherein said connecting tubes extend with clearance through respective openings formed in said steam jacket, and including connecting means located outside said steam jacket and connecting said connecting tubes respectively to said steam jacket.

* * * * *